(12) United States Patent
Liu et al.

(10) Patent No.: US 11,889,355 B2
(45) Date of Patent: Jan. 30, 2024

(54) METHOD AND APPARATUS FOR FLOW CONTROL

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/998,078

(22) Filed: Aug. 20, 2020

(65) Prior Publication Data
US 2020/0413292 A1    Dec. 31, 2020

Related U.S. Application Data

(63) Continuation of application No. PCT/CN2020/094723, filed on Jun. 5, 2020.

(30) Foreign Application Priority Data

Jun. 28, 2019 (WO) ................ PCT/CN2019/093784

(51) Int. Cl.
*H04W 28/12*   (2009.01)
*H04W 28/02*   (2009.01)
*H04W 88/14*   (2009.01)

(52) U.S. Cl.
CPC ....... *H04W 28/02* (2013.01); *H04W 28/0273* (2013.01); *H04W 28/0278* (2013.01); *H04W 88/14* (2013.01)

(58) Field of Classification Search
CPC ..... H04W 28/10; H04W 28/12; H04W 28/02; H04W 28/0273; H04W 28/0278; H04W 88/14; H04W 28/0284; H04W 28/0289
See application file for complete search history.

(56) References Cited

U.S. PATENT DOCUMENTS

2004/0017796 A1\*   1/2004  Lemieux ................ H04L 45/50
                                                 370/349
2007/0036079 A1\*   2/2007  Chowdury ........ H04W 28/0284
                                                 370/235
(Continued)

FOREIGN PATENT DOCUMENTS

CN           108574967 A         9/2018
EP           1847082 A1 \*  10/2007  ........... H04L 12/189
(Continued)

OTHER PUBLICATIONS

Sequans Communications, "R2-1810451: Flow control considerations for IAB," 3GPP TSG-RAN WG2#NR AH1807, Jul. 2-6, 2018, Montreal, Canada, 4 pages.
(Continued)

*Primary Examiner* — Sudesh M Patidar
(74) *Attorney, Agent, or Firm* — Withrow & Terranova, PLLC

(57) ABSTRACT

Various embodiments of the present disclosure provide a method for flow control. The method which may be performed by a first radio device comprises generating a first flow control message based at least in part on flow control information per flow control group. The method further comprises transmitting the first flow control message to a second radio device.

16 Claims, 9 Drawing Sheets

(56) References Cited

U.S. PATENT DOCUMENTS

| | | |
|---|---|---|
| 2010/0302946 A1 | 12/2010 | Yang et al. |
| 2012/0099431 A1* | 4/2012 | Hou ...................... H04L 47/266 |
| | | 370/235 |
| 2014/0321282 A1* | 10/2014 | Pragada ............ H04W 36/0072 |
| | | 370/235 |
| 2015/0155930 A1 | 6/2015 | Liu et al. |
| 2016/0044530 A1* | 2/2016 | Cheng ............... H04W 28/0289 |
| | | 370/235 |
| 2016/0094446 A1* | 3/2016 | Kazmi .............. H04W 28/0289 |
| | | 370/392 |
| 2018/0063014 A1 | 3/2018 | Yu et al. |
| 2018/0175924 A1* | 6/2018 | Ercan .................... H04W 76/16 |
| 2018/0220328 A1* | 8/2018 | Agarwal ........... H04W 28/0289 |
| 2018/0324642 A1* | 11/2018 | Yu ............................. H04L 1/22 |
| 2019/0159277 A1 | 5/2019 | Zhu et al. |
| 2020/0137611 A1* | 4/2020 | Majmundar .......... H04W 92/20 |
| 2020/0260327 A1* | 8/2020 | Idan ........................ H04L 47/32 |
| 2020/0322841 A1* | 10/2020 | Hyun ................. H04W 72/1226 |
| 2021/0007011 A1* | 1/2021 | Zhu ....................... H04W 28/12 |
| 2021/0014875 A1* | 1/2021 | Lee .................. H04W 28/0278 |
| 2021/0282050 A1* | 9/2021 | Adjakple .......... H04W 28/0273 |

FOREIGN PATENT DOCUMENTS

| | | |
|---|---|---|
| EP | 2445166 A1 | 4/2012 |
| WO | 2018237001 A1 | 12/2018 |
| WO | 2019042213 A1 | 3/2019 |

OTHER PUBLICATIONS

Sequans Communications, "R2-1812851: Flow control for DL data congestion," 3GPP TSG-RAN WG2 Meeting #103, Aug. 20-24, 2018, Gothenburg, Sweden, 4 pages.

ZTE, "R2-1812463: Discussion on flow control in IAB," 3GPP TSG-RAN WG2 Meeting #103, Aug. 20-24, 2018, Gothenburg, Sweden, 5 pages.

International Search Report and Written Opinion for International Patent Application No. PCT/CN2020/094723, dated Sep. 2, 2020, 9 pages.

Blackberry UK Limited, "R2-134116: Necessity of flow control for various U-plan alternative," 3GPP TSG RAN WG2 Meeting #84, Nov. 11-15, 2013, San Francisco, California, 4 pages.

First Office Action for Chinese Patent Application No. 202080046252.1, dated May 11, 2023, 9 pages.

Extended European Search Report for European Patent Application No. 20831320.5, dated May 9, 2023, 9 pages.

* cited by examiner

METHOD AND APPARATUS FOR FLOW CONTROL

RELATED APPLICATIONS

The present application is a continuation of International Application Number PCT/CN2020/094723 filed Jun. 5, 2020, which claims the benefit of International Application Number PCT/CN2019/093784 filed Jun. 28, 2019, the disclosures of which are incorporated herein by reference in their entireties.

FIELD OF THE INVENTION

The present disclosure generally relates to communication networks, and more specifically, to flow control in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks are expected to achieve high traffic capacity and end-user data rate. In order to meet dramatically increasing network requirements, one interesting option for communication technique development is to introduce new system structures and access mechanisms such as integrated access backhaul (IAB). An IAB node can be scheduled by its parent IAB node, and can also schedule its child IAB node(s) and/or one or more user equipments (UEs) connected to this IAB node. For data traffics on an IAB path between a UE and a donor IAB node, flow control (FC) can be used to adjust data rate, so as to avoid congestion on an intermediate IAB node in the IAB path. For example, a FC message can be used to report the congestion status in an IAB path so that the network can take FC actions accordingly.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

For a wireless communication network such as a new radio (NR) network with IAB, various FC mechanisms such as end-to-end FC and hop-by-hop FC mechanisms may be applied to control ingress data rate in response to a congestion event. For example, a FC report per UE/flow/data radio bearer (DRB) may be triggered by the congestion event, so that an IAB node receiving the FC report can adjust data rate for the corresponding UE/flow/DRB to mitigate a congestion risk. However, the FC report per UE/flow/DRB basis may significantly increase signaling overhead especially for the case that a large number of UEs/flows/DRBs suffer from congestion in a backhaul link of the IAB network. In another word, since the FC message is expected to be triggered upon congestion occurrence, an efficient FC message design can enable a proper congestion status report with small overhead. Therefore, it may be desirable to implement enhancement of FC efficiently to improve network performance.

Various embodiments of the present disclosure propose a solution for FC in a communication network, which can enable a FC message to be generated for a group of UEs (or DRBs, data flows, services, logical channels (LCHs), backhaul radio link control (RLC) channels, etc.), so that multiple FC reports for different UEs/DRBs/flows/services/LCHs/backhaul RLC channels can be summarized in the FC message to avoid large overhead and reduce processing complexity.

According to a first aspect of the present disclosure, there is provided a method performed by a first radio device in an IAB network. The method may comprise generating a first FC message based at least in part on FC information per FC group. The method may further comprise transmitting the first FC message to a second radio device.

In accordance with an exemplary embodiment, the method according to the first aspect of the present disclosure may further comprise: receiving a second FC message from a third radio device.

In accordance with an exemplary embodiment, the method according to the first aspect of the present disclosure may further comprise: performing FC for a link between the first radio device and the third radio device, based at least in part on the second FC message.

In accordance with an exemplary embodiment, the method according to the first aspect of the present disclosure may further comprise: aggregating two or more FC messages into an aggregated FC message, and transmitting the aggregated FC message to a fourth radio device.

According to a second aspect of the present disclosure, there is provided an apparatus which may be implemented as a first radio device. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a first radio device. The apparatus may comprise a generating unit and a transmitting unit. In accordance with some exemplary embodiments, the generating unit may be operable to carry out at least the generating step of the method according to the first aspect of the present disclosure. The transmitting unit may be operable to carry out at least the transmitting step of the method according to the first aspect of the present disclosure.

According to a fifth aspect of the present disclosure, there is provided a method performed by a second radio device in an IAB network. The method may comprise receiving a first FC message from a first radio device. The first FC message may be generated based at least in part on FC information per FC group. Optionally, the method may further comprise processing the first FC message, in response to the reception of the first FC message.

In accordance with an exemplary embodiment, the processing of the first FC message may comprise: performing FC for a link between the first radio device and the second radio device, based at least in part on the first FC message.

Alternatively or additionally, the processing of the first FC message may comprise: transmitting the first FC message to a third radio device.

In accordance with an exemplary embodiment, the method according to the fifth aspect of the present disclosure may further comprise: generating a second FC message based at least in part on FC information per FC group.

In accordance with an exemplary embodiment, the method according to the fifth aspect of the present disclosure may further comprise: aggregating two or more FC messages into an aggregated FC message, and transmitting the aggregated FC message to a fourth radio device.

According to a sixth aspect of the present disclosure, there is provided an apparatus which may be implemented as a second radio device. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a second radio device. The apparatus may comprise a receiving unit and optionally a processing unit. In accordance with some exemplary embodiments, the receiving unit may be operable to carry out at least the receiving step of the method according to the fifth aspect of the present disclosure. The processing unit may be operable to carry out at least the processing step of the method according to the fifth aspect of the present disclosure.

In accordance with an exemplary embodiment, the FC group may include: one or more UEs, one or more data flows, one or more DRBs, one or more LCHs, one or more services, or one or more RLC channels.

In accordance with an exemplary embodiment, the FC group can be determined according to a group configuration rule which is related to at least one of the following grouping information: UE information, channel quality information, data flow information, DRB information, LCH information, service information, RLC channel information (e.g. RLC channel ID), and radio resource allocation information.

In accordance with an exemplary embodiment, the generation of the first FC message may be triggered based at least in part on the grouping information.

In accordance with an exemplary embodiment, the group configuration rule may indicate whether the FC group is configured for a link, or across multiple links, or for a path between a source device and a destination device.

In accordance with an exemplary embodiment, the FC information per FC group may indicate at least one of:
 transmission status of data packets for the FC group;
 reception status of the data packets for the FC group;
 transmission buffer status of the data packets for the FC group;
 reception buffer status of the data packets for the FC group;
 queuing delay of the data packets for the FC group; and
 a difference between ingress data rate and egress data rate for the FC group.

In accordance with an exemplary embodiment, the first FC message may comprise one or more fields to indicate at least one of:
 a group identifier of the FC group;
 status information of data packets for the FC group;
 a cause for triggering the generation of the first FC message;
 an indicator of a link for which the first FC message is generated; and
 a congestion level of the data packets for the FC group.

In accordance with an exemplary embodiment, the status information of data packets for the FC group may comprise the buffer status of data packets for the FC group.

In accordance with an exemplary embodiment, the generation of the first FC message may be periodical or in response to a trigger event.

In accordance with an exemplary embodiment, the trigger event may comprise congestion occurrence.

In accordance with an exemplary embodiment, the first FC message may comprise FC information of one or more other FC groups in addition to the FC group.

In accordance with an exemplary embodiment, the generation of the first FC message may be triggered by two or more FC groups.

In accordance with an exemplary embodiment, the first FC message may be generated for at least one of hop-by-hop FC and end-to-end FC.

In accordance with an exemplary embodiment, any of the first radio device, the second radio device, the third radio device and the fourth radio device may comprise one of a terminal device, an IAB node, a node B, a transmission point and a relay node.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to any of the first and fifth aspects of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to any of the first and fifth aspects of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to any of the first and fifth aspects of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to any of the first and fifth aspects of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to any of the first and fifth aspects of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to any of the first and fifth aspects of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to any of the first and fifth aspects of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to any of the first and fifth aspects of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
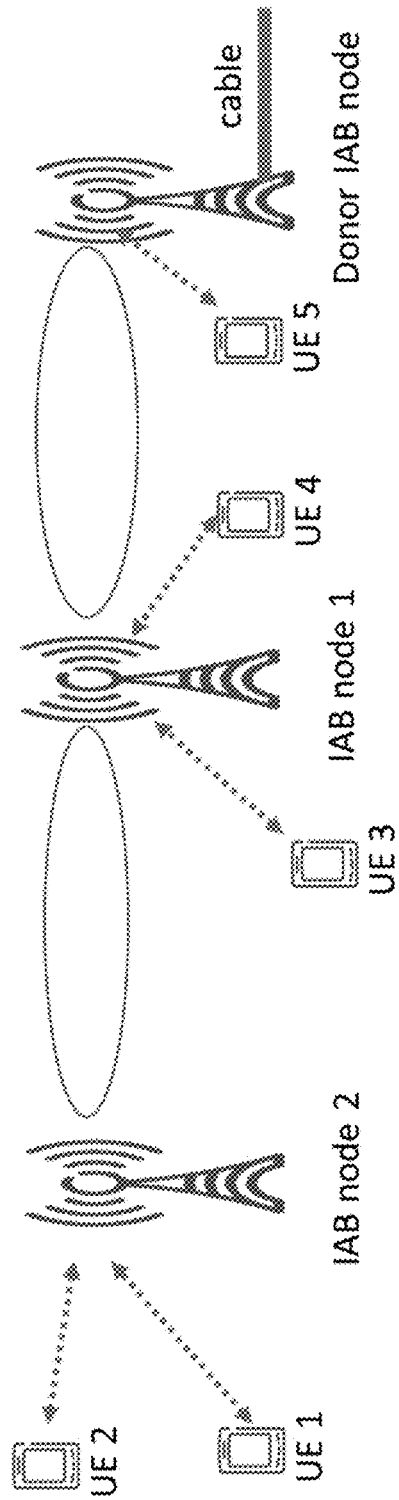
FIG. 1 is a diagram illustrating an example of an NR network with IAB capability according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a radio device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "radio device" refers to a terminal device, a network node or any communication device that can transmit control/data traffics to other communication device in a communication network, and/or receive control/data traffics from other communication device in the communication network. By way of example and not limitation, the radio device may refer to a UE, an IAB node (IAB-N), a transmission point, a relay node, and so forth.

The term "network node" refers to a network device in a communication network via which a radio device accesses to the network and receives services therefrom. The network node may refer to a base station, an access point (AP), a multi-cell/multicast coordination entity (MCE), a controller or any other suitable device in a wireless communication network. The base station may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a radio device access to a wireless communication network or to provide some service to a radio device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide a variety of telecommunication services such as voice, video, data, messaging and broadcasts. To meet the diverse service requirements on traffic capacity and data rates, the 3rd generation partnership project (3GPP) is developing a wireless communication network such as an NR network configured with IAB capability.

FIG. 1 is a diagram illustrating an example of an NR network with IAB capability according to some embodiments of the present disclosure. For the NR network with IAB capability, an AP (such as IAB node 2 shown in FIG. 1) can setup a radio connection to another AP (such as IAB node 1 shown in FIG. 1) in order to reach a donor AP (such as the donor IAB node shown in FIG. 1) which has a wireline backhaul. An AP in this network scenario is also referred to as an IAB node. The radio connection between IAB nodes (IAB-Ns) is referred to as a wireless backhaul or a self-backhaul. For simplicity, FIG. 1 only shows an IAB network with three IAN nodes and five UEs, where UE 1 and UE 2 are connected to IAB node 2, UE 3 and UE 4 are connected to IAB node 1, and UE 5 is connected to the donor IAB node. The IAB node with a backhaul cable acts as the donor IAB node, and IAB node 1 acts as a bridge node between IAB node 2 and the donor IAB node. In this example, IAB node 1 is referred to as a parent IAB node of IAB node 2, and IAB node 2 is referred to as a child IAB node of IAB node 1. The IAB node connected to a UE is called as an access IAB node for the UE. As shown in FIG. 1, the access IAB node can serve the UE via upstream wireless backhaul links. It will be appreciated that there may be other network scenarios where more or less IAB nodes can be deployed in the network to implement different system structures, although FIG. 1 only shows one donor IAB node having two child IAB nodes in the network.

For an IAB node, there may be three types of links, for example, including upstream links to/from a parent IAB node, downstream links to/from a child IAB node, and a number of downlinks/uplinks to/from the served UEs for accessing the network. The first two types of links are also referred to as backhaul links. The network with IAB capability (which is also referred to as IAB network for simplicity) is supposed to handle data communication among various links for a number of IAB nodes and their served UEs in the network.

For downlink (DL) data transmission from a donor IAB node through an IAB path to a UE, the donor IAB node can forward the DL data through the preconfigured IAB path to an access IAB node for the UE, and the access IAB node can further transmit the DL data to the UE via an access link. For uplink (UL) data transmission from the UE to the donor IAB node, the access IAB node can receive the UL data from the UE and forward the data to the donor IAB node via the IAB path. Flow control (FC) may be used to control the ingress data rate into the IAB path so that the buffer overflow or long queuing delay in an intermediate IAB node in the IAB path can be avoided. For the DL data transmission, the donor IAB node can adjust the ingress data rate to the IAB path. For the UL data transmission, the access IAB node can adjust the ingress data rate to the IAB path. Considering that an UL scheduler can control UL grants to a UE or a child IAB node whenever necessary, the UL buffer overflow can be avoided usually, but this does not help resolve the congestion status since the capacity of the IAB path is not improved.

In accordance with some exemplary embodiments, the end-to-end FC and/or the hop-by-hop FC may be used in an IAB network. For the end-to-end FC, the congestion status of the whole IAB path can be evaluated by a donor central unit (CU) based on the data transmission status of the whole IAB path. For the hop-by-hop FC, a child IAB node can report the congestion status to its parent IAB node in a certain way so that the parent IAB node can control the DL data rate to the child IAB node. The hop-by-hop FC mechanism may relieve the congestion status of a single DL backhaul link at the cost of transmission buffer increase of the parent IAB node. The benefit is the quick response to the congestion status compared to the end-to-end FC.

In order to achieve finer granularities for quality of service (QoS) support, the end-to-end FC for an IAB path and/or the hop-by-hop FC for a backhaul link may be triggered per UE DRB or per service flow. For this case, there may be a risk of high control overhead created by FC messages along the path. On one hand, a DRB identifier (ID) may be represented by 20 bits and a flow label (or UE ID) may be of comparable length. On the other hand, for an IAB network, each IAB node in an IAB path may serve a number of UEs and the maximum number of UEs may be huge. Since a UE may be configured with multiple DRBs (or data flows) and the IAB network may serve many UEs, there may be a large number of (e.g. thousands of) DRBs or service data flows served along a backhaul link. When a congestion event occurs and there are many UE DRBs suffering congestion in this backhaul link, a FC message per UE/DRB/flow reported by each UE may create high control signaling overhead, especially for the case that the UE ID is included in each FC message. The large overhead for reporting FC messages may make network performance worse since the FC messages reported by the UEs may block transmission of critical data.

In order to reduce signaling overhead for FC reports and improve the resource efficiency of a communication network such as an IAB network, various exemplary embodiments of the present disclosure propose a FC solution which can enable a radio device (e.g., a UE, an IAB node, etc.) to report some FC information (e.g., data transmission/reception status information, etc.) per group of UEs (or UE data flows, UE DRBs, services, LCHs, backhaul RLC channels, etc.) for a backhaul link, so that a FC message may contain the FC information per group. Upon reception of this kind of FC message, an IAB node which injects data into an IAB path can adjust the injection data rate accordingly. The IAB node which injects data into the IAB path may be referred to as a data injection IAB node (e.g., an access IAB node in UL or a donor IAB node in DL). The proposed FC solution may be more beneficial for DL, although it can also be used for UL as well. It can be appreciated that although some embodiments are described with respect to an IAB network, the proposed solution is also applicable to other non-IAB scenarios where there may be an issue of high signaling overhead due to transmission of FC messages.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 2:
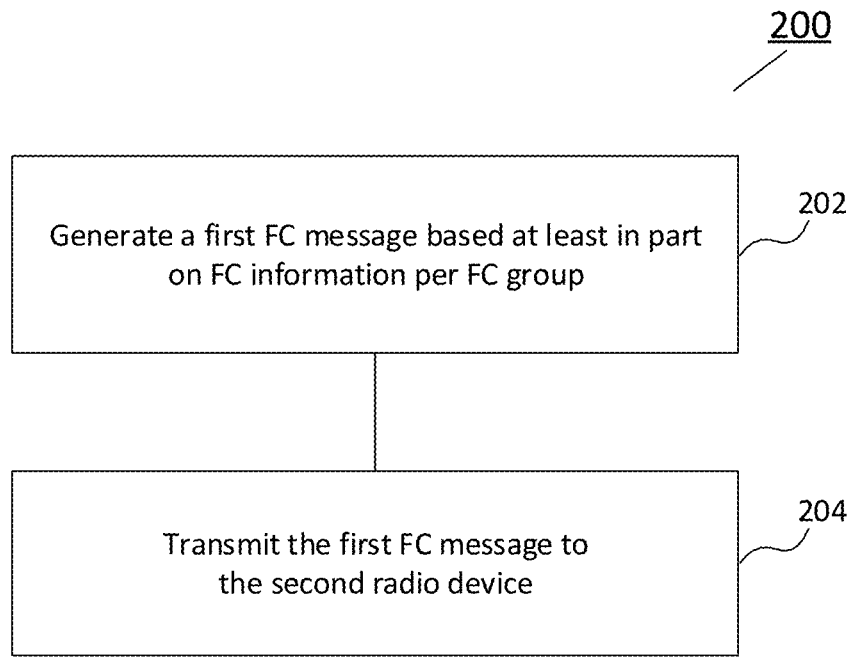
FIG. 2 is a flowchart illustrating a method according to some embodiments of the present disclosure.

FIG. 2 is a flowchart illustrating a method 200 according to some embodiments of the present disclosure. The method 200 illustrated in FIG. 2 may be performed by a first radio device or an apparatus communicatively coupled to the first radio device. In accordance with an exemplary embodiment, the first radio device may comprise a terminal device (e.g., a UE, a mobile station, etc.), an IAB node (e.g., an access IAB node, an intermediate IAB node, a donor IAB node, etc.), a base station, a node B, a transmission point, a relay node, etc. The first radio device may be configured to support FC for a communication link or a communication path.

According to the exemplary method 200 illustrated in FIG. 2, the first radio device can generate a first FC message based at least in part on FC information per FC group, as shown in block 202. In an exemplary embodiment, the FC group may have one or more members (e.g., UEs, data flows, DRBs, etc.) related to data flowing through a link between the first radio device and a second radio device. In accordance with some exemplary embodiments, the FC group may include one or more UEs, one or more data flows, one or more DRBs, one or more LCHs, one or more services, or one or more RLC channels. It can be appreciated that the FC group may include other types of members which may have the same or similar properties complying with a specific group configuration rule.

In accordance with some exemplary embodiments, the FC group can be determined according to a group configuration rule which may be related to at least one of the following grouping information:

UE information (e.g., device category, mobility state, subscriber profile, subscribed service, etc.);

channel quality information (e.g., link condition, channel measurement, interference estimate, etc.);

data flow information (e.g., flow ID, flow priority, etc.);

DRB information (e.g., DRB ID, etc.);

LCH information (e.g., LCH ID, LCH priority, etc.);

service information (e.g., QoS requirements, service type, service ID, etc.);

RLC channel information (e.g., channel priority, channel ID, etc.);

radio resource allocation information (e.g., assignment type, grant type, resource configuration scheme, etc.); and routing information (e.g. routing ID, etc.).

In accordance with some exemplary embodiments, a FC group may be formed for specific DRBs/flows/LCHs/services belonging to the same or different UEs. Optionally, the FC group may be formed and configured by a CU. The LCH priorities (such as QoS class identifier (QCI) in LTE, 5G QoS indicator (5QI), QoS flow identifier (QFI), etc.), channel quality measurements and/or mobility measurements may be considered in the group establishment. In an example, the CU may configure a FC group containing a range of LCH priority values. In another example, a FC group may be configured to serve specific services with QoS requirements such as a range of requirements in terms of latency, transmission reliability, etc. In yet another example, a FC group may be formed for UEs having connections with similar radio channel quality or with similar mobility states.

In accordance with some exemplary embodiments, a FC group may be configured per backhaul RLC channel (or per backhaul DRB) so that the FC information (e.g., transmission status and/or reception status) can be reported per backhaul RLC channel group (or per backhaul DRB). For instance, the FC group can be determined according to the LCH priority of the backhaul RLC channel. As an example, the LCH priority can be used as a group ID and the backhaul RLC channels having the same LCH priority may be included in the same FC group for reporting transmission/reception status in a FC message. In this example, the transmission/reception status can be reported per LCH priority value. As another example, the LCH priorities can be grouped and the backhaul RLC channels with the LCH priorities in the same LCH priority group may be included in the same FC group for the transmission/reception status report in a FC message. In this example, the transmission/reception status can be reported per LCH priority group.

According to an exemplary embodiment, in response to reception of a FC message comprising the transmission status and/or the reception status for at least one FC group such as backhaul RLC channel group, a radio device such as a data injection IAB node can derive the UE data flows which are mapped to the backhaul RLC channels belonging to the backhaul RLC channel group, and adjust the data injection rate for these UE data flows accordingly.

In accordance with some exemplary embodiments, the group configuration rule may indicate whether the FC group is configured or formed for a link, or across multiple links, or for a path between a source device and a destination device. For example, the FC group may be formed or generated per backhaul link, or across backhaul links per UL/DL direction, or per UL/DL IAB path between an access IAB node and a donor IAB node. Correspondingly, the first FC message described in block 202 may be generated for at least one of hop-by-hop FC and end-to-end FC. According to some exemplary embodiments, the generation of the first FC message may be periodical or in response to a trigger event (e.g. congestion occurrence).

In accordance with some exemplary embodiments, the generation of the first FC message may be triggered based at least in part on the grouping information. For example, the FC group can be determined according to the assignment/grant type. Optionally, the generation of the first FC message may be triggered if the semi-persistent scheduling (SPS) assignment or the configured scheduling (CS) grant capacity is far higher or lower than the traffic data rate that is expected to be served using SPS assignments or CS grants. Alternatively or additionally, the generation of the first FC message may be triggered in response that the channel quality, QoS, transmission latency, congestion level, etc. related to the FC group cannot satisfy a specific criterion. It can be appreciated that there may be one or more predefined/preconfigured rules available for the first radio device (such as an IAB node) to trigger the generation of the first FC message.

In accordance with some exemplary embodiments, the first FC message may comprise one or more fields to indicate at least one of:
 a group identifier of the FC group (e.g., a group index, etc.);
 status information of data packets for the FC group (e.g., transmission/reception status, buffer status, etc.);
 a cause for triggering the generation of the first FC message (e.g., a specific reason why the first FC message is triggered);
 an indicator of a link for which the first FC message is generated (e.g., an Internet protocol (IP) address or a broadband access point (BAP) entity ID of the parent/child IAB node, etc.); and
 a congestion level of the data packets for the FC group (e.g. low transmission/reception (TX/RX) buffer level, high TX/RX buffer level, buffer overflow, etc.).

It will be realized that the above fields and related information in the first FC message are just as examples. In practice, there may be more or less fields and information carried by the first FC message. For example, the first FC message may carry the FC information of the FC group for which the first FC message is triggered, and optionally contain other information derived from or related with the FC information per FC group.

In accordance with some exemplary embodiments, the FC information per FC group may indicate at least one of:
 transmission status of data packets for the FC group;
 reception status of the data packets for the FC group;
 transmission buffer status of the data packets for the FC group;
 reception buffer status of the data packets for the FC group;
 queuing delay of the data packets for the FC group; and
 a difference between ingress data rate and egress data rate for the FC group.

The FC information per FC group can at least partially reflect the current communication performance of the FC group. In accordance with some exemplary embodiments, the generation of the first FC message may be triggered by two or more FC groups. In this case, the first FC message may comprise FC information of the two or more FC groups. Optionally, the first FC message may comprise FC information of one or more other FC groups which may not trigger the generation of the first FC message and/or suffer from congestion. In an exemplary embodiment, it may be possible that only the transmission/reception status for associated FC groups which suffer from congestion is included into the first FC message. Alternatively or additionally, the transmission/reception status for all FC groups can be included into the first FC message.

According to the exemplary method 200 illustrated in FIG. 2, the first radio device can transmit the first FC message to the second radio device, as shown in block 204. In this way, the FC information and/or other associated information such as transmission/reception status for the associated FC group can be reported to the second radio device by the first radio device. According to an exemplary embodiment, the data transmission status based on the receiver buffer status for data packets belong to the same FC group can be reported in the first FC message. Alternatively or additionally, the queuing delay of all data packets belonging to the same FC group can be reported in the first FC message. As an example, the queuing delay may be defined as the average or maximum queuing delay of all data packets belonging to this FC group. Alternatively or additionally, a difference between the ingress data rate and the egress data rate for each FC group can be reported in the first FC message.

In accordance with some exemplary embodiments, the first radio device described with respect to FIG. 2 may receive a second FC message from a third radio device. Optionally, the first radio device may forward the second FC message to the second radio device and/or other radio device. Alternatively or additionally, the first radio device can perform FC for a link between the first radio device and the third radio device, based at least in part on the second FC message.

In accordance with some exemplary embodiments, the first radio device can aggregate two or more FC messages into an aggregated FC message. In this case, multiple FC messages (e.g., FC messages locally generated by the first radio device and/or received from other radio devices) can be merged into a single message for reporting FC information. According to an exemplary embodiment, the first radio device can transmit the aggregated FC message to a fourth radio device (e.g., a radio device acting as the upstream/downstream node of the first radio device).

Figure 3:
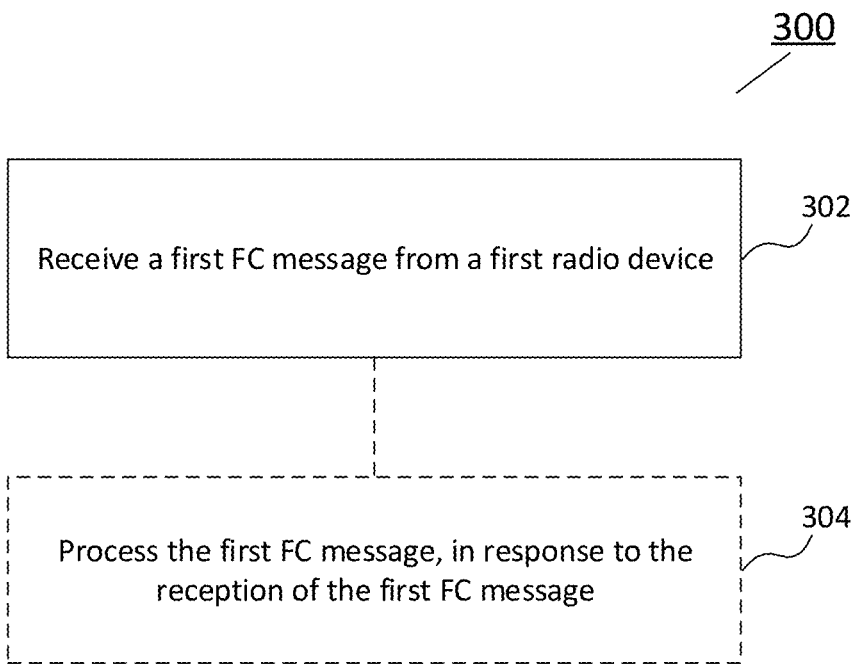
FIG. 3 is a flowchart illustrating another method according to some embodiments of the present disclosure.

FIG. 3 is a flowchart illustrating another method 300 according to some embodiments of the present disclosure. The method 300 illustrated in FIG. 3 may be performed by a second radio device or an apparatus communicatively coupled to the second radio device. In accordance with an exemplary embodiment, the second radio device may comprise a terminal device (e.g., a UE, a mobile station, etc.), an IAB node (e.g., an access IAB node, an intermediate IAB node, a donor IAB node, etc.), a base station, a node B, a transmission point, a relay node, etc. The second radio device may be configured to support FC for a communication link or a communication path.

According to the exemplary method 300 illustrated in FIG. 3, the second radio device can receive a first FC message from a first radio device (such as the first radio device described with respect to FIG. 2), as shown in block 302. The first FC message may be generated based at least in part on FC information per FC group. As mentioned previously, the FC group may have one or more members related to data flowing through a link between the first radio device and the second radio device. For example, according to the types of members of the first FC message, the FC group may comprise a UE group, a data flow group, a DRB group, a LCH group, a service group, a RLC channel group, etc.

In accordance with some exemplary embodiments, some UEs, services, data flows, UE LCHs or UE DRBs satisfying the requirement of a group configuration rule may be included in the same FC group and share the same group ID. Optionally, the group configuration rule may indicate whether the FC group is configured for a link (e.g., an upstream link, a downstream link, an uplink, a downlink, etc.), or across multiple links, or for a data path routing from an originating node to a terminating node.

As described with respect to FIG. 2, the group configuration rule may be related to some grouping information, and the generation of the first FC message may be triggered based at least in part on the grouping information. The first FC message may be provided by the first radio device (e.g., a gNB, an IAB node, etc.) in periodic fashion or in an event trigger fashion. Correspondingly, the reception of the first FC message by the second radio device may be periodical or due to a specific event. Optionally, the first radio device, a CU or other suitable entity may configure a trigger criterion for the first FC message.

In accordance with some exemplary embodiments, the generation of the first FC message may be triggered by more than one FC group. No matter whether the generation of the first FC message is triggered by a single FC group or multiple FC groups, the first FC message can carry FC information of one or more FC groups (e.g., including the FC group(s) triggering the first FC message, and optionally one or more FC groups which do not trigger the first FC message).

According to an exemplary embodiment, the FC information per FC group may comprise various status information (e.g., transmission/reception status, buffer status, etc.) and/or performance information (e.g., queuing delay, data rate, etc.) of data packets for the FC group. As an example, the data transmission/reception status can be reported per UE group, per UE service data flow group, per UE LCH group, or per UE DRB group. In an exemplary embodiment, the first FC message may have one or more fields to indicate the reported information, for example, including but not limited to a group index, an indicator on the reason why the first FC message is triggered, some information on the transmission/reception status or buffer status, an indicator (e.g. IP address or BAP entity ID of the parent/child IAB node) of a link (e.g., a backhaul link, an access link, etc.) for which the first FC message is generated, the congestion level (e.g. TX/RX buffer level, buffer overflow, etc.), or any combination thereof.

According to the exemplary method 300 illustrated in FIG. 3, the second radio device may optionally process the first FC message, in response to the reception of the first FC message, as shown in block 304. In an exemplary embodiment, the processing of the FC message may comprise: performing FC for the link between the first radio device and the second radio device, based at least in part on the first FC message. For example, the second radio device can determine the corresponding FC strategy according to the FC information per FC group obtained from the first FC message. Alternatively or additionally, the processing of the first FC message may comprise transmitting the first FC message to a third radio device. It can be appreciated that the second radio device can just forward the first FC message received from the first radio device to the third radio device, without decoding or analyzing the first FC message. Optionally, the second radio device can determine how to process the first FC message according to whether the first FC message is generated for hop-by-hop FC or end-to-end FC.

In accordance with some exemplary embodiments, the second radio device can aggregate two or more FC messages into an aggregated FC message, and transmit the aggregated FC message to a fourth radio device. According to an embodiment, along an IAB path, there may be multiple UEs/IAB nodes in the same FC group that have triggered a FC message. A child IAB node that triggers the FC message can send the FC message to its parent IAB node. The parent IAB node can aggregate the received FC message(s) from the downstream IAB nodes with its own FC message, and send the aggregated FC message to further upstream IAB nodes. In an exemplary embodiment, upon reception of a FC message containing group specific transmission/reception status, the data injection IAB node can adjust the injection data rate for the IAB path with respect to the FC group, in the case that a congestion condition is detected on the IAB path. It can be appreciated that the exemplary embodiments can also be applied for the hop-by-hop FC, in addition to the end-to-end FC.

According to an exemplary embodiment, the second radio device may be equipped with the same or similar capabilities as the first radio device described with respect to FIG. 2 and accordingly can perform the method 200 illustrated in FIG. 2. For example, the second radio device may generate a second FC message based at least in part on FC information per FC group. Optionally, the second FC message generated by the second radio device can be transmitted to other radio device separately from or together with one or more other FC messages.

In accordance with some exemplary embodiments, any of the first radio device, the second radio device, the third radio device and the fourth radio device described in connection with FIG. 2 and FIG. 3 may comprise one of a terminal device, an IAB node, a node B, a transmission point and a relay node. It can be appreciated that in addition to these types of devices, other proper communication devices may be involved in implementation of the methods according to various embodiments.

The proposed solution according to one or more exemplary embodiments can enable a radio device (e.g., a UE or an IAB node) to report group specific FC information (e.g., data transmission/reception status, buffer status, communication latency, etc.) to another radio device in a FC message. According to the proposed solution, it is not necessary for the radio device to trigger a FC message per UE (e.g., for each UE DRB or data flow). Advantageously, the reports for FC with respect to different UEs/DRBs/data flows/LCHs/services/backhaul RLC channels can be grouped together, so that a summarized report for FC can be triggered per group. Thus, the large overhead for reporting a FC message per UE/flow/DRB can be avoided. On the other hand, the inclusion of various information for different group members into a FC message can enhance the accuracy of the transmission/reception status report for FC. Moreover, the application of the proposed solution can reduce the complexity to use the FC message to control the injection data rate.

The various blocks shown in FIGS. 2-3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 4:
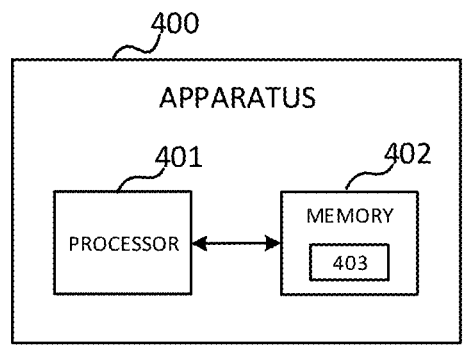
FIG. 4 is a block diagram illustrating an apparatus according to some embodiments of the present disclosure.

FIG. 4 is a block diagram illustrating an apparatus 400 according to various embodiments of the present disclosure. As shown in FIG. 4, the apparatus 400 may comprise one or more processors such as processor 401 and one or more memories such as memory 402 storing computer program codes 403. The memory 402 may be non-transitory machine/processor/computer readable storage medium. In accordance with some exemplary embodiments, the apparatus 400 may be implemented as an integrated circuit chip or module that can be plugged or installed into a first radio device as described with respect to FIG. 2, or a second radio device as described with respect to FIG. 3. In such case, the apparatus 400 may be implemented as a first radio device described with respect to FIG. 2, or a second radio device described with respect to FIG. 3.

In some implementations, the one or more memories 402 and the computer program codes 403 may be configured to, with the one or more processors 401, cause the apparatus 400 at least to perform any operation of the method as described in connection with FIG. 2. In other implementations, the one or more memories 402 and the computer program codes 403 may be configured to, with the one or more processors 401, cause the apparatus 400 at least to perform any operation of the method as described in connection with FIG. 3.

Alternatively or additionally, the one or more memories 402 and the computer program codes 403 may be configured to, with the one or more processors 401, cause the apparatus 400 at least to perform more or less operations to implement the proposed methods according to the exemplary embodiments of the present disclosure.

Figure 5:
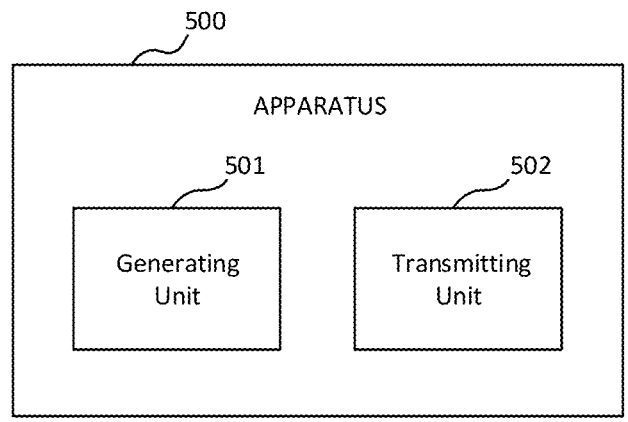
FIG. 5 is a block diagram illustrating another apparatus according to some embodiments of the present disclosure.

FIG. 5 is a block diagram illustrating an apparatus 500 according to some embodiments of the present disclosure. As shown in FIG. 5, the apparatus 500 may comprise a generating unit 501 and a transmitting unit 502. In an exemplary embodiment, the apparatus 500 may be implemented as a first radio device as described with respect to FIG. 2 or as a part of the first radio device. The generating unit 501 may be operable to carry out the operation in block 202, and the transmitting unit 502 may be operable to carry out the operation in block 204. Optionally, the generating unit 501 and/or the transmitting unit 502 may be operable to carry out more or less operations to implement the proposed methods according to the exemplary embodiments of the present disclosure.

Figure 6:
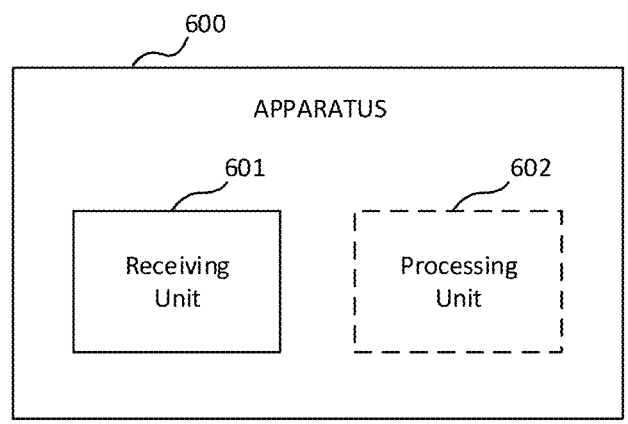
FIG. 6 is a block diagram illustrating yet another apparatus according to some embodiments of the present disclosure.

FIG. 6 is a block diagram illustrating an apparatus 600 according to some embodiments of the present disclosure. As shown in FIG. 6, the apparatus 600 may comprise a receiving unit 601 and optionally a processing unit 602. In an exemplary embodiment, the apparatus 600 may be implemented as a second radio device as described with respect to FIG. 3 or as a part of the second radio device. The receiving unit 601 may be operable to carry out the operation in block 302, and the processing unit 602 may be operable to carry out the operation in block 304. Optionally, the receiving unit 601 and/or the processing unit 602 may be operable to carry out more or less operations to implement the proposed methods according to the exemplary embodiments of the present disclosure.

Figure 7:
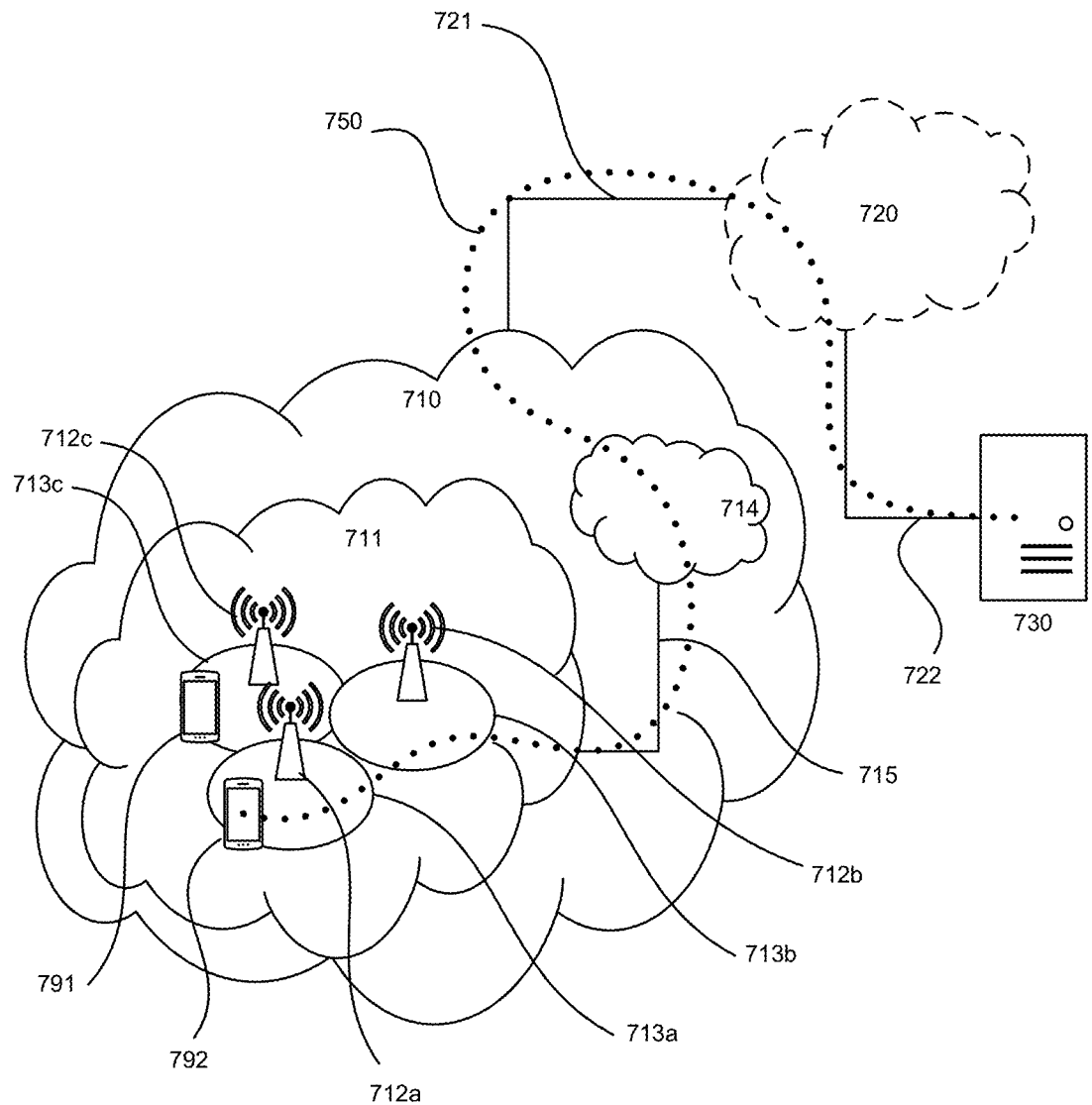
FIG. 7 is a block diagram illustrating a telecommunication network connected via an intermediate network to a host computer in accordance with some embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in a coverage area 713c is configured to wirelessly connect to, or be paged by, the corresponding base station 712c. A second UE 792 in a coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

Figure 8:
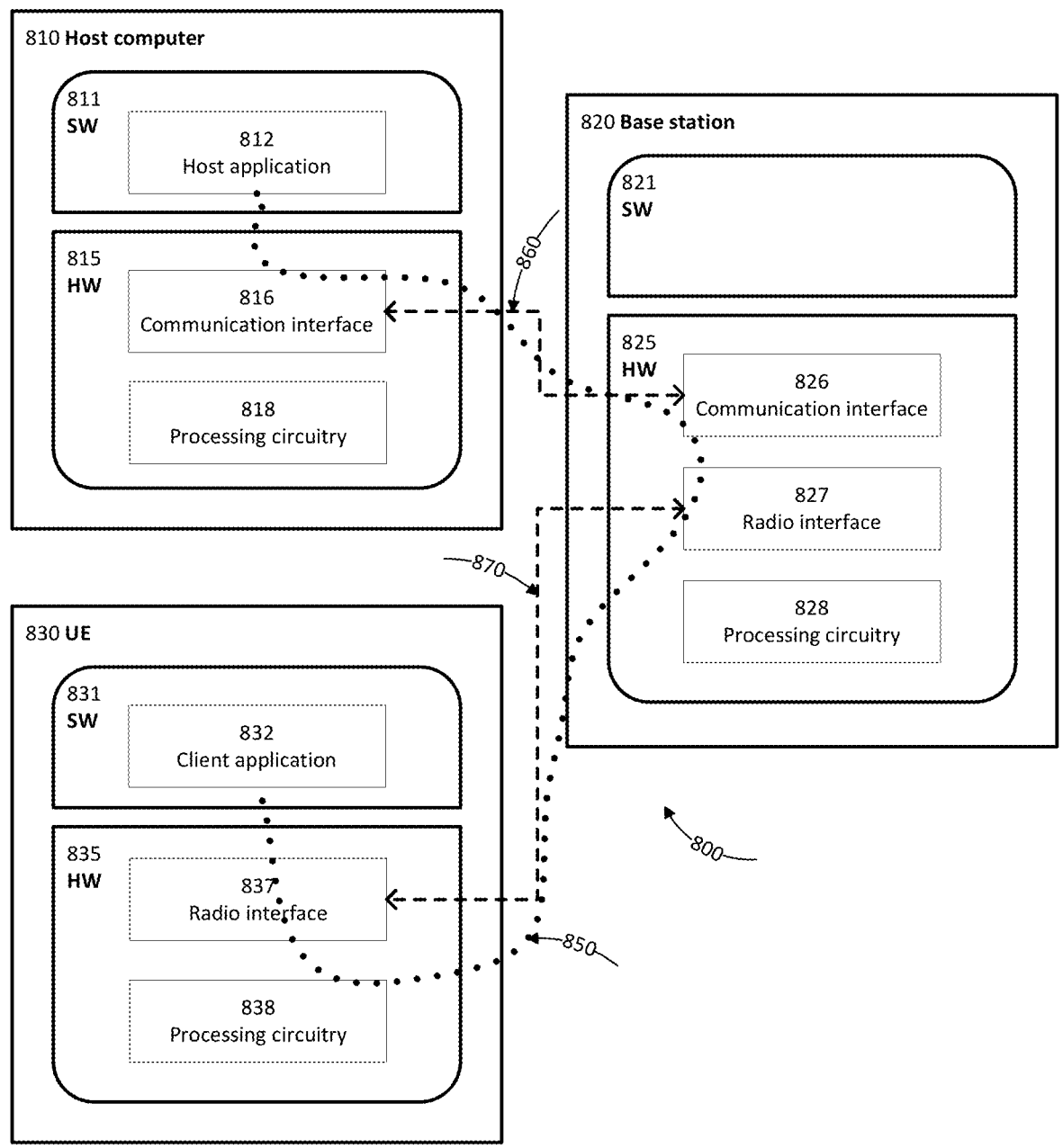
FIG. 8 is a block diagram illustrating a host computer communicating via a base station with a UE over a partially wireless connection in accordance with some embodiments of the present disclosure.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

Figure 9:
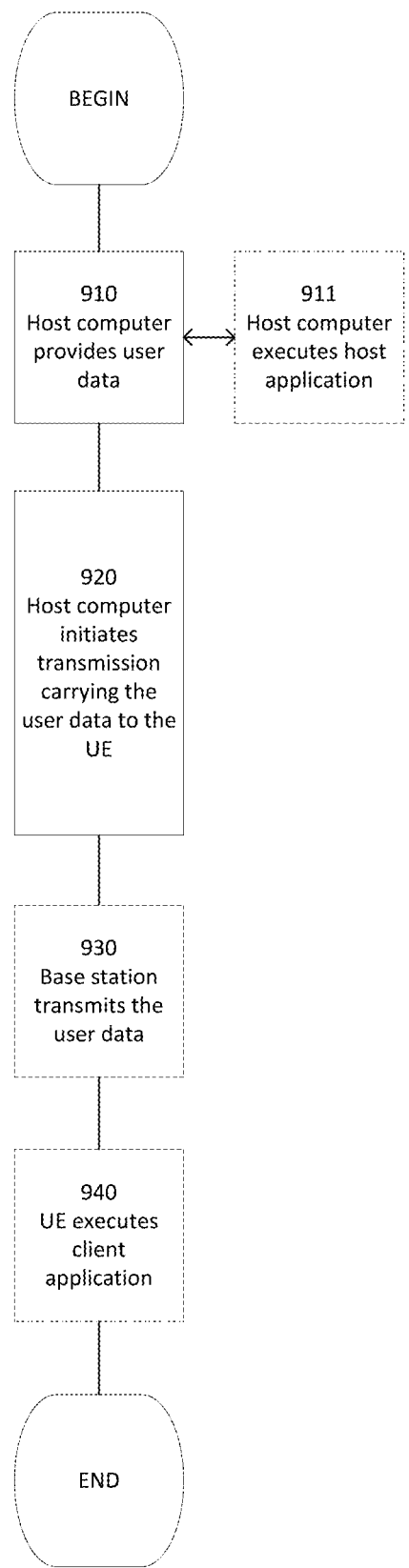
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
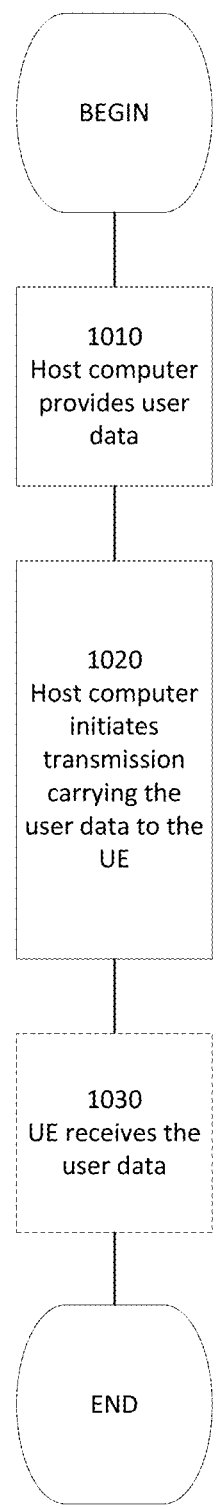
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
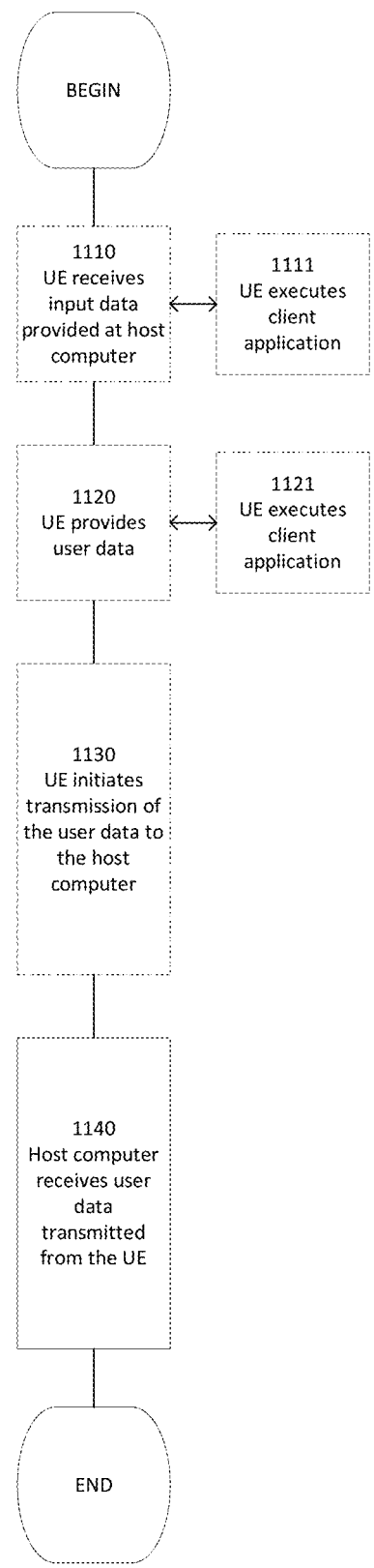
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
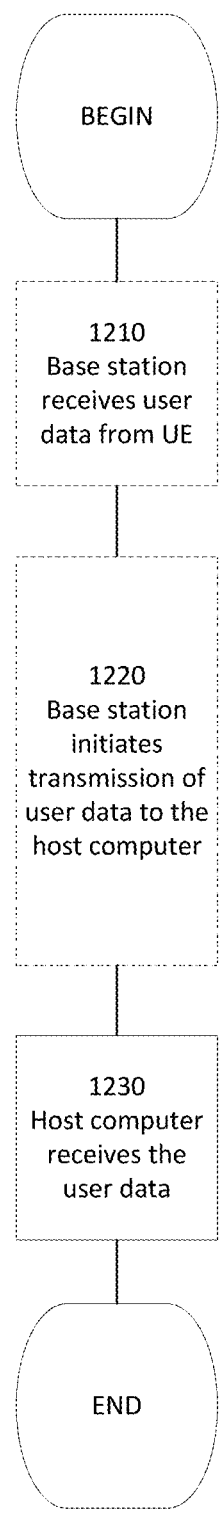
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a first radio device in an Integrated Access Backhaul, IAB, network, comprising:
    generating a first flow control message based at least in part on flow control information per flow control group, where the generation of the first flow control message is periodical or in response to a trigger event; and
    transmitting the first flow control message to a second radio device;
    wherein the flow control group includes one or more of the group consisting of:
        one or more radio link control, RLC, channels;
        one or more user equipment;
        one or more data flows;
        one or more data radio bearers;
        one or more logical channels; and
        one or more services; and
    wherein the first flow control message comprises one or more fields to indicate: status information of data packets for the flow control group;
    wherein the flow control group is determined according to a group configuration rule which is related to:
        RLC channel information;
    wherein the group configuration rule indicates whether the flow control group is configured for a link, or across multiple links, or for a path between a source device and a destination device.

2. The method according to claim 1, wherein the RLC channel information comprises RLC channel Identification, ID.

3. The method according to claim 1, wherein the flow control information per flow control group indicates at least one of:
    transmission status of the data packets for the flow control group;
    reception status of the data packets for the flow control group;
    transmission buffer status of the data packets for the flow control group;
    reception buffer status of the data packets for the flow control group;
    queuing delay of the data packets for the flow control group; and
    a difference between ingress data rate and egress data rate for the flow control group.

4. The method according to claim 1, wherein the first flow control message further comprises one or more fields to indicate at least one of the group consisting of:
    a group identifier of the flow control group;
    a cause for triggering the generation of the first flow control message;
    an indicator of a link for which the first flow control message is generated; and
    a congestion level of the data packets for the flow control group.

5. The method according to claim 1, wherein the status information of data packets for the flow control group comprises a buffer status of data packets for the flow control group.

6. The method according to claim 1, wherein the trigger event comprises a congestion occurrence.

7. The method according to claim 1, wherein any of the first radio device and the second radio device comprises one of a terminal device, an integrated access backhaul node, a node B, a transmission point and a relay node.

8. A method performed by a second radio device in an Integrated Access Backhaul, IAB, network, comprising:
    receiving a first flow control message from a first radio device, wherein the first flow control message is generated based at least in part on flow control information per flow control group, where the generation of the first flow control message is periodical or in response to a trigger event;
    wherein the flow control group includes one or more of the group consisting of:
        one or more radio link control, RLC, channels;
        one or more user equipment;
        one or more data flows;
        one or more data radio bearers;
        one or more logical channels; and
        one or more services; and
    wherein the first flow control message comprises one or more fields to indicate: status information of data packets for the flow control group;
    wherein the flow control group is determined according to a group configuration rule which is related to
        RLC channel information;
    wherein the group configuration rule indicates whether the flow control group is configured for a link, or across multiple links, or for a path between a source device and a destination device.

9. The method according to claim 8, wherein RLC channel information comprises RLC channel Identification, ID.

10. The method according to claim 8, wherein the flow control information per flow control group indicates at least one of:
    transmission status of the data packets for the flow control group;
    reception status of the data packets for the flow control group;
    transmission buffer status of the data packets for the flow control group;
    reception buffer status of the data packets for the flow control group;
    queuing delay of the data packets for the flow control group; and
    a difference between ingress data rate and egress data rate for the flow control group.

11. The method according to claim 8, wherein the first flow control message further comprises one or more fields to indicate at least one of the group consisting of:
    a group identifier of the flow control group;
    a cause for triggering the generation of the first flow control message;
    an indicator of a link for which the first flow control message is generated; and
    a congestion level of the data packets for the flow control group.

12. The method according to claim 8, wherein the status information of data packets for the flow control group comprises a buffer status of data packets for the flow control group.

13. The method according to claim 8, wherein the trigger event comprises congestion occurrence.

14. The method according to claim 8, further comprising:
processing the first flow control message, in response to the reception of the first flow control message.

15. The method according to claim 1, wherein the group configuration rule is further related to at least one of the following grouping information:
user equipment information;
channel quality information;
data flow information;
data radio bearer information;
logical channel information;
service information; and
radio resource allocation information.

16. The method according to claim 8, wherein the group configuration rule is further related to at least one of the following grouping information:
user equipment information;
channel quality information;
data flow information;
data radio bearer information;
logical channel information;
service information; and
radio resource allocation information.

* * * * *